Sept. 12, 1939.  A. FERRARI ET AL  2,172,790
JUICE EXTRACTING MACHINE
Filed Nov. 3, 1937   5 Sheets-Sheet 1
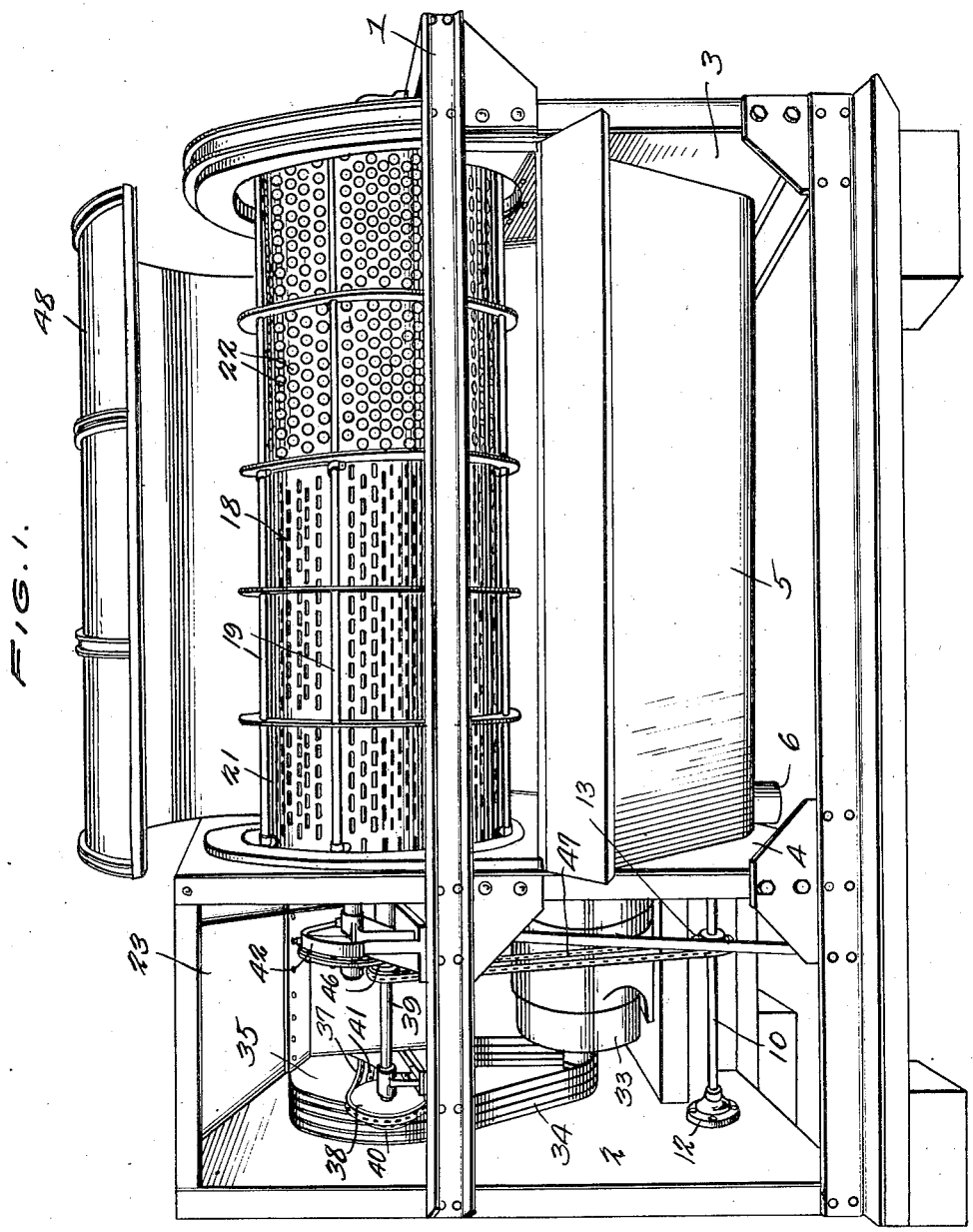
Abele Ferrari
Mario Scalione
Cesare Rafanelli
INVENTORS

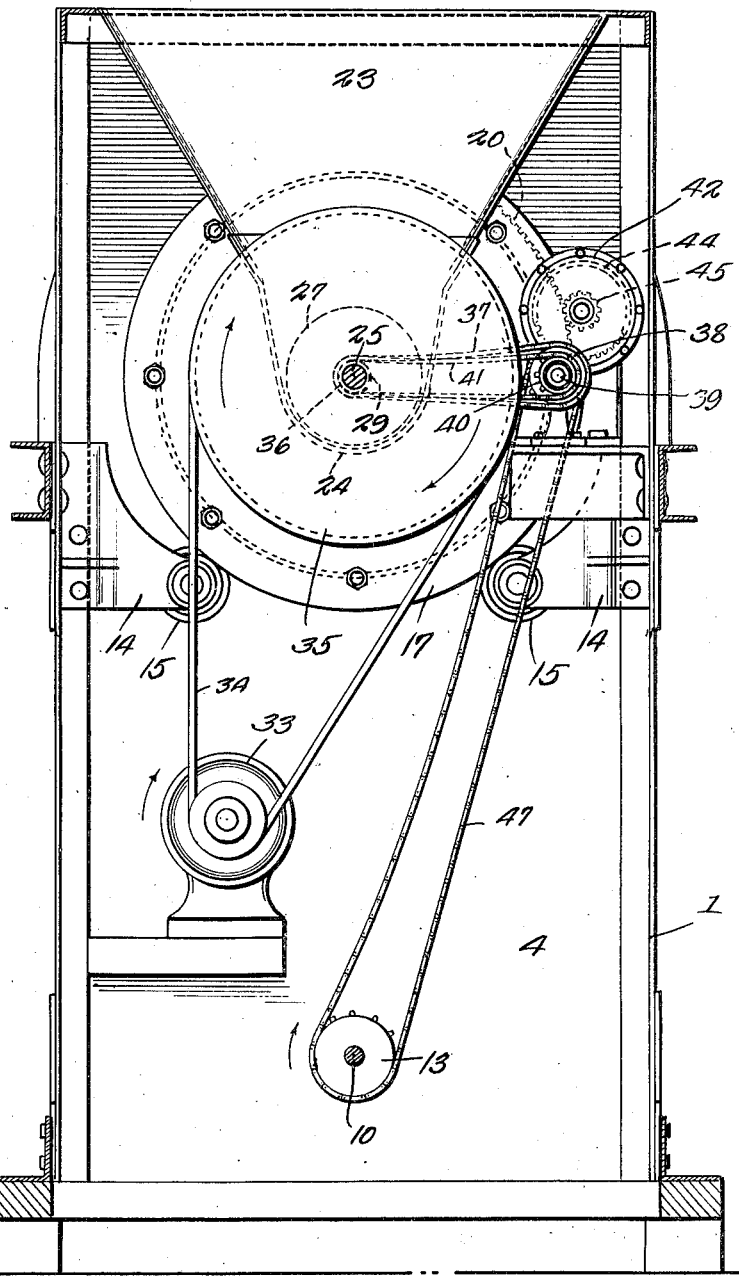
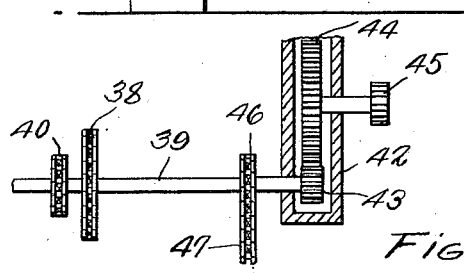

Sept. 12, 1939. A. FERRARI ET AL 2,172,790
JUICE EXTRACTING MACHINE
Filed Nov. 3, 1937 5 Sheets-Sheet 3

Abele Ferrari
Mario Scalione
Cesare Rafanelli
INVENTORS

BY *CA Snow & Co.*

ATTORNEYS.

Sept. 12, 1939.　　A. FERRARI ET AL　　2,172,790
JUICE EXTRACTING MACHINE
Filed Nov. 3, 1937　　5 Sheets-Sheet 4
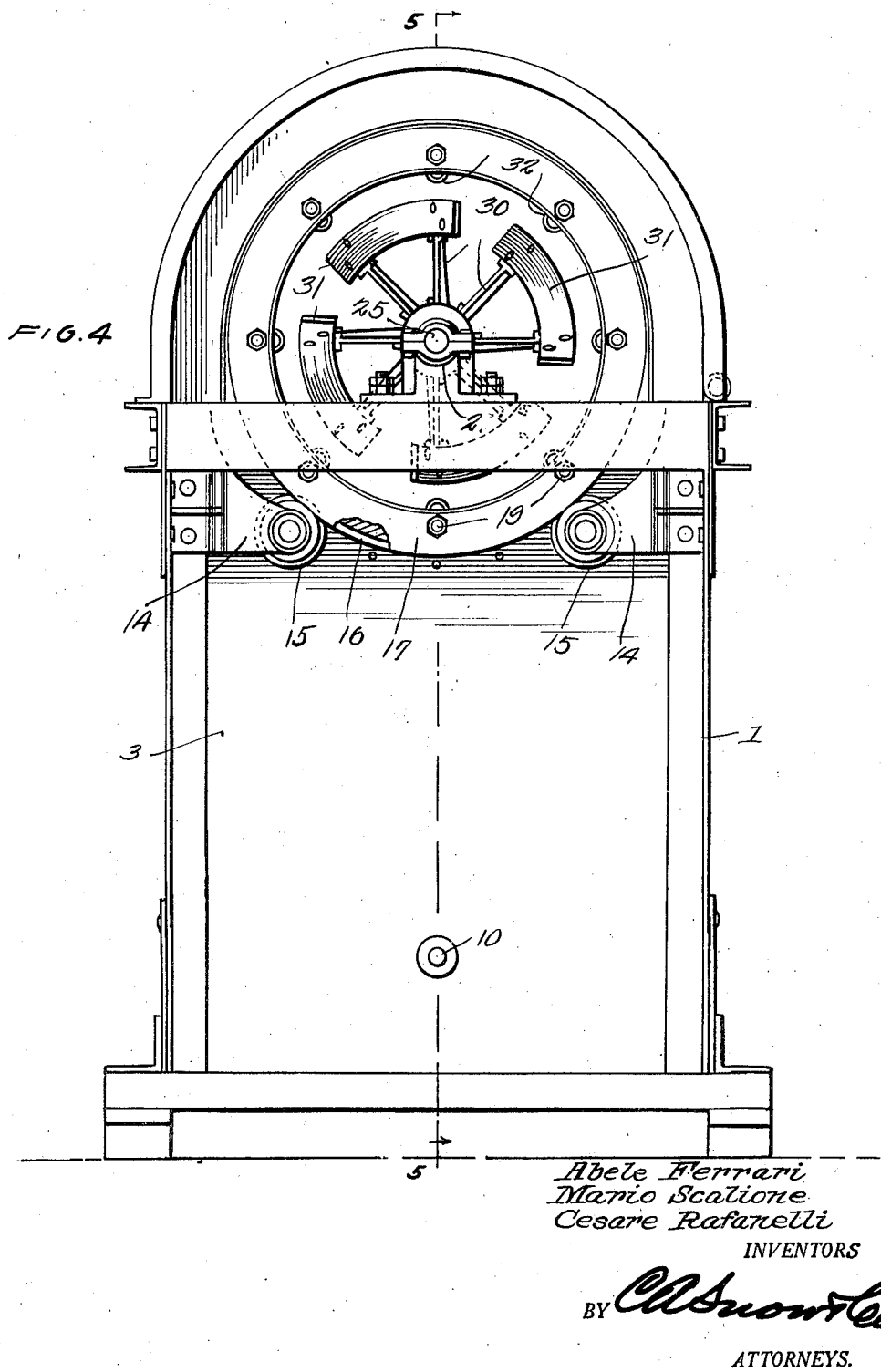
Abele Ferrari
Mario Scalione
Cesare Rafanelli
INVENTORS
BY *A. Snow & Co.*
ATTORNEYS.

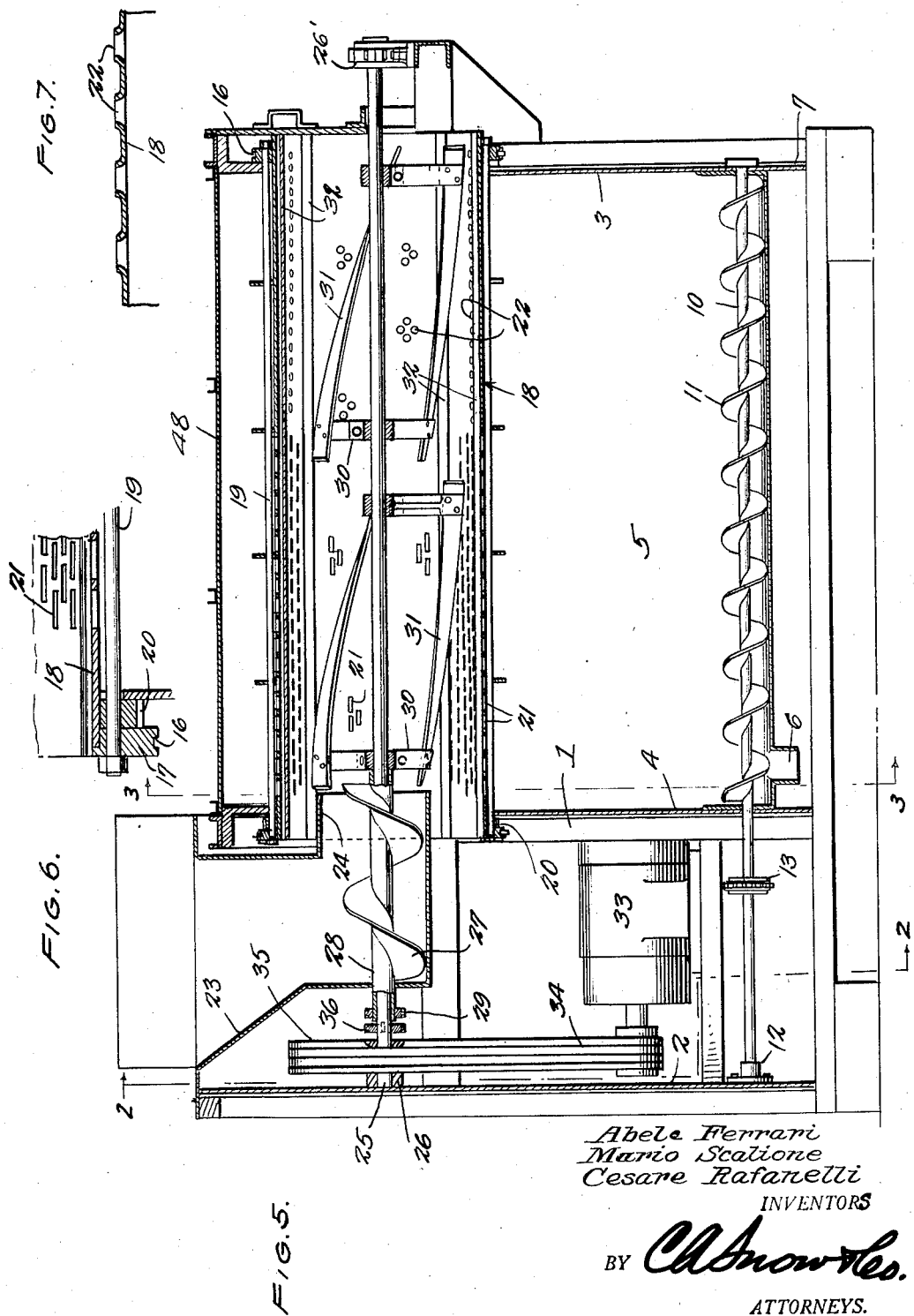

Patented Sept. 12, 1939

2,172,790

UNITED STATES PATENT OFFICE 2,172,790

JUICE EXTRACTING MACHINE

Abele Ferrari, Mario Scalione, and Cesare Rafanelli, Healdsburg, Calif.

Application November 3, 1937, Serial No. 172,640

2 Claims. (Cl. 146—174)

This invention relates to a machine for extracting juice from grapes.

Heretofore it has been the practice, when removing juice from grapes, to feed the grapes between the corrugated surfaces of cooperating rolls. In order to properly extract the juice by this means, it has been necessary to place the rolls close together and as a result, the rolls generally have crushed the seeds and stems. Following the crushing operation, the pulp with the crushed seeds and stems mixed therewith, has been forced over a perforated surface by suitable means provided for that purpose with the result that as the pulp was forced through the perforated surface, the seeds and stems have been further crushed and forced into and through the perforations so as to mix with the resultant pulp.

Obviously this method of treatment has not been desirable because the crushed seeds and stems produce a bitter, puckery, astringent flavor with the result that the grape pulp and juice has become unpalatable and even injurious.

An object of the present invention is to eliminate the objectionable features herein mentioned by providing means whereby the grapes are reduced to pulp and juice extracted therefrom without being crushed between two unyielding surfaces and, therefore, without crushing the seeds or stems.

It is a further object to provide a machine which will not only be efficient in operation but will also reduce the grapes to pulp and juice more rapidly than by other methods.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings—

Figure 1 is a perspective view of the machine, the lid or cover being open.

Figure 2 is a vertical transverse section through one end, showing the driving mechanism in elevation.

Figure 4 is an end elevation showing the outlet end of the rotatable drum.

Figure 5 is a section on line 5—5, Figure 4.

Figure 6 is an enlarged section through a portion of one end of the rotatable drum.

Figure 7 is an enlarged section through another section of the drum.

Figure 8 is a detail view of a portion of the drive mechanism.

Figure 3:
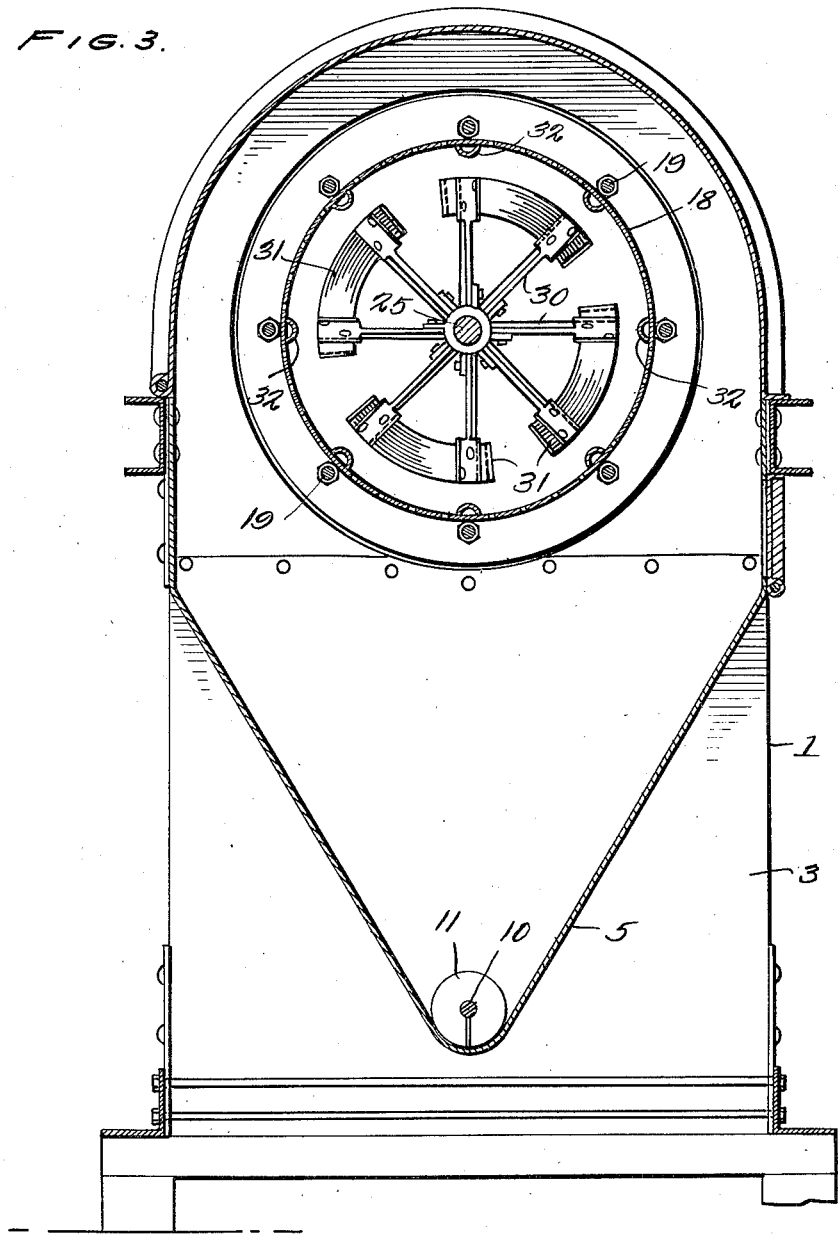
Figure 3 is a central, vertical transverse section through the machine.

Referring to the figures by characters of reference 1 designates a frame of suitable construction having end plates 2 and 3 and an intermediate plate 4. A trough 5 is interposed between the lower portions of plates 3 and 4 and supported thereby. This trough has an outlet 6 in the bottom thereof.

Extending longitudinally of the trough is a shaft 10 carrying a worm conveyer 11 and one end of the shaft projects beyond the trough and is supported by a bearing 12 on plate 2, this portion of the shaft being provided with a sprocket 13.

Brackets 14 are carried by portions of the frame 1 and carry supporting wheels 15 which project into annular grooves 16 provided in end rings 17. These rings extend around and are suitably secured to the respective ends of a drum 18 and these end rings are held assembled with the drum 18 by means of tie-rods 19 extending longitudinally of the drum and secured within the rings. The tie-rods also serve to secure to the drum a ring gear 20.

The drum 18, which is formed preferably of sheet metal, has its inlet portion formed with parallel oblong slots 21 disposed in staggered relation, these slots being arranged from the inlet end of the drum to a point adjacent to the center thereof. The remainder of the drum located from the opposite end inwardly to the slotted portion, is provided with a number of outstruck bell-shaped openings 22.

A feed hopper 23 is supported by one end portion of the frame 1 and has an outlet spout substantially cylindrical, as indicated at 24, this spout being extended into and concentric with the inlet end portion of the drum. A longitudinal shaft 25 is extended axially within the outlet spout 24 and within drum 18, this shaft being journalled in bearings 26 and 26' provided therefor at the respective ends of the machine and being provided with a feed worm 27 located entirely within the bottom portion of the hopper 23 and within its spout 24. This feed worm is carried by a sleeve 28 rotatably mounted on the shaft 25 and having a gear 29 which can be in the form of a sprocket.

That portion of shaft 25 located within drum 18 and beyond spout 24 and sleeve 28 has radial arms or spiders 30 secured thereto which carry spiral beating blades 31 supported adjacent to the surface of the drum but spaced a sufficient distance therefrom to avoid crushing the seeds or stems of the fruit being acted upon. For cooperation with these beater blades there are provided semi-cylindrical beater bars 32 which extend longitudinally along the inner surface of the drum but are spaced from the paths of the beater blades a sufficient distance to prevent crushing of seeds and stems.

For the purpose of operating the mechanism there is employed an electric motor 33 adapted to transmit motion through a belt 34 to a pulley 35 secured to the main shaft 25. This main shaft in turn has a sprocket 36 or the like for transmitting motion through a chain 37 to a sprocket 38 on a countershaft 39. Another sprocket 40 is secured to the countershaft and is adapted to transmit motion through a chain 41 to the sprocket 29 which is secured to sleeve 28. This gearing constitutes means for reducing speed so that, if the shaft 25 carrying the beater arms is driven at a speed of 375 R. P. M., the sleeve 28 carrying the feed worm 27, can be driven at a speed of 130 R. P. M.

The counter-shaft 39 extends into a gear casing 42 where it is provided with a gear 43 meshing with a larger gear 44 which, in turn, rotates with a smaller gear 45. This latter gear is in constant mesh with the ring gear 20 on the drum. The gearing described constitutes speed reduction means so that, if the worm 27 and shaft 25 are rotating at the speeds heretofore mentioned, this drum can be caused to rotate, for example, at 6 R. P. M.

Another sprocket 46 is secured to the countershaft 39 and is adapted to transmit motion through chain 47 to the sprocket 13 on the shaft 10.

For the purpose of preventing loss of pulp and juice during the operation of the machine, it is preferred to provide a movable cover 48 for extending partly around the drum 18. In Figure 1 this cover has been shown raised to fully expose the drum.

When the motor is operated, the several parts will be driven approximately at the speed stated, it being understood that the beater blade 31 and the drum will rotate in the same direction although at different speeds. The worm 27 is also pitched so as to force the material into the drum when the worm is rotating in the same direction as the shaft 25. Worm 11 will of course be operated to feed material toward the outlet 6.

Fruits of different kinds can be used in the described machine although the structure is designed primarily for use in extracting juice from grapes. The fruit to be treated is supplied to the machine from hopper 23, it being moved forcibly into the receiving end of the drum by the rotating worm 27. When the fruit enters the drum it will fall into the path of the rotating beater blades 31 which, revolving at a high speed, will not only beat the fruit but also throw it outwardly against the beating bars 32 and the apertured surface of the drum. In view of the spacing provided, however, the seeds and stems will not be crushed. This forcible beating and propulsion of the fruit will result in breaking up the pulp so that the juice will be separated therefrom and, furthermore, the centrifugal action set up and the air current produced by the rotating beating blades, will cause the juice to escape outwardly through slots 21 and the opening 22, leaving the stems, substantially dry, in the drum until they are discharged from the outlet end thereof by the propelling action of the spiral blades 31.

The extracted juices will gravitate within the trough 5 together with desirable pulp which will be free from stems and particles of seeds, the accumulated material being delivered to the outlet 6 by the worm 11.

It has been found in practice that by effecting the extraction of juices by mechanism such as herein described, the bitter and astringent quality present when stems and seeds are crushed, is eliminated and a more desirable product is produced than by other means heretofore employed.

The action of the beating blade, the vibration set up, and the constant circulation of air due to the fan-like action of the blades, keeps the pulp and stems constantly in motion so that the apertures in the drum will not become clogged.

The upper portion of the outlet and of the drum can be closed normally by a removable plate 7.

What is claimed is:

1. A machine for extracting juice from grapes without crushing the stems and seeds of the grapes, said machine including a rotatable apertured drum, a concentric shaft therein, spiral beating blades connected to the shaft and pitched to direct engaged material longitudinally of the drum, beating bars extending longitudinally along the inner surface of the drum, a feeding worm extending into the drum and coaxial with the shaft, and a driving element operatively connected to the drum, shaft and worm for rotating the same simultaneously in the same direction but at different speeds respectively.

2. A machine for extracting juice from grapes without crushing the seeds or stems of the grapes, said machine including a rotatable apertured drum, a concentric shaft therein, spiral beating blades connected to the shaft and pitched to direct engaged material longitudinally of the drum, beating bars extending longitudinally along the inner surface of the drum, a feeding worm extending into the drum and coaxial with the shaft, and a driving element operatively connected to the drum, shaft and worm for rotating them simultaneously in the same direction but at different speeds respectively, the speed of rotation of the worm being less than that of the beating blades but greater than that of the drum.

ABELE FERRARI.
MARIO SCALIONE.
CESARE RAFANELLI.